United States Patent [19]

Shanelec

[11] Patent Number: 5,073,444
[45] Date of Patent: Dec. 17, 1991

[54] MOLDED POLYPROPYLENE FOAM TIRE CORES

[76] Inventor: Dennis A. Shanelec, 1515 State St., Suite 1, Santa Barbara, Calif. 93101

[21] Appl. No.: 463,458

[22] Filed: Jan. 11, 1990

[51] Int. Cl.⁵ .................... B32B 27/38; C08J 9/24
[52] U.S. Cl. .................... 428/313.5; 152/310; 152/316; 156/112; 264/45.4; 521/60; 521/142; 521/143; 521/56
[58] Field of Search .......... 521/56, 60; 152/310; 428/413-415

[56] References Cited

U.S. PATENT DOCUMENTS

| | | | |
|---|---|---|---|
| Re. 32,780 | 11/1988 | Yoshimura et al. | 521/144 |
| 4,058,152 | 11/1977 | Beck et al. | 152/310 |
| 4,504,534 | 3/1985 | Adachi et al. | 521/58 |
| 4,504,601 | 3/1985 | Kuwabara et al. | 521/60 |

Primary Examiner—Morton Foelak
Attorney, Agent, or Firm—Robert M. Sperry

[57] ABSTRACT

A molded polypropylene foam tire core suitable for all types of wheels. The core may be inserted, in one or more sections, into a pneumatic-type tire casing and mounted on a wheel rim to provide puncture-proof and rupture-proof internal support for said tire casing.

4 Claims, 1 Drawing Sheet

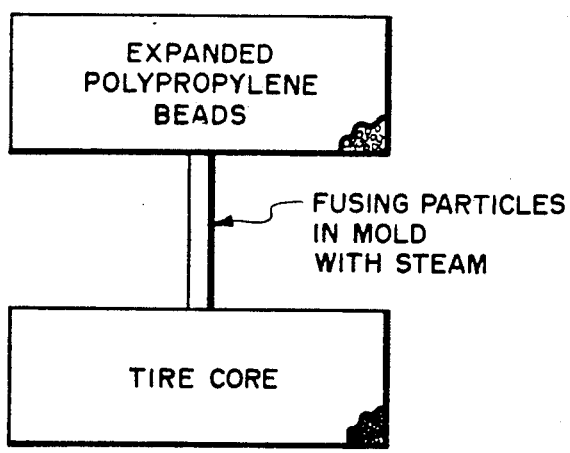
Fig. 5A.
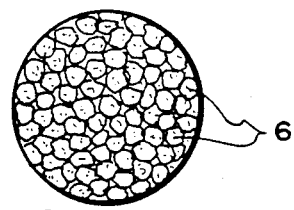
Fig. 5B.
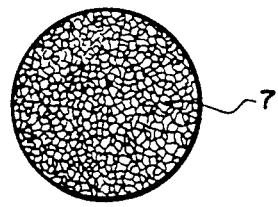
Fig. 5C.
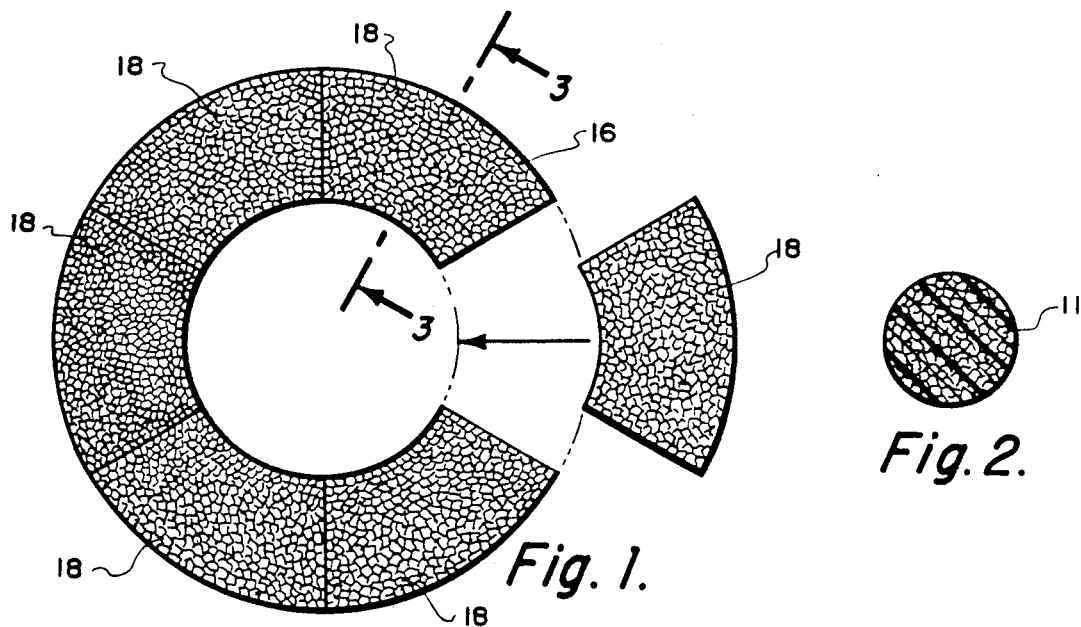
Fig. 1.
Fig. 2.
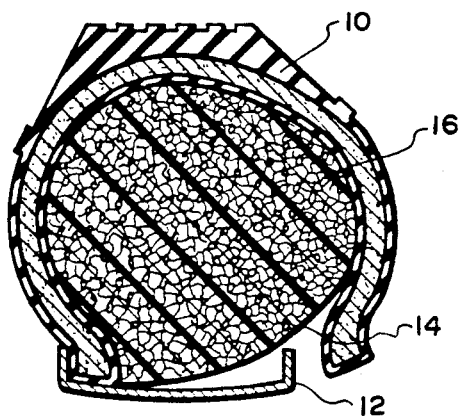
Fig. 3.
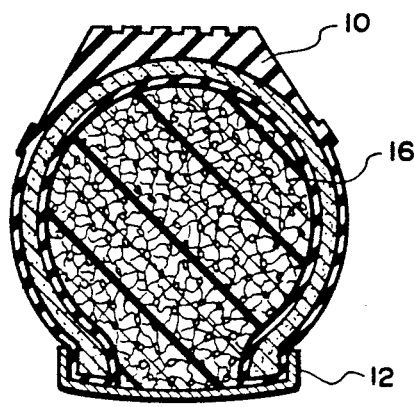
Fig. 4.

MOLDED POLYPROPYLENE FOAM TIRE CORES

BACKGROUND

1. Field of Invention

This invention relates to vehicle tires and especially to polypropylene foam tire cores and a method whereby such tire cores are molded from polypropylene foam beads under steam pressure and are inserted in a pneumatic tire casing.

2. Prior Art

Conventional pneumatic vehicle tires consist of an outer casing which is given the desired load-bearing capacity and elasticity by means of air pumped into the casing or into an inner tube fitted within the casing. Unfortunately, such pneumatic tires are subject to explosive decompression, when punctured, which may create serious hazards for the occupants of the vehicle or of nearby vehicles, especially if the puncture occurs while the vehicle is travelling at high speed or on a crowded road, such as a freeway. Numerous attempts have been made heretofore to overcome these disadvantages by filling the tire casing with other materials. A search in the United States Patent Office has revealed the following:

| PATENT NO. | INVENTOR | ISSUED |
| --- | --- | --- |
| 1,415,140 | Beckman | 1922 |
| 1,470,048 | Barker | 1923 |
| 1,488,998 | Marshall | 1924 |
| 2,166,511 | Witzenmann | 1939 |
| 3,022,810 | Lambe | 1962 |
| 3,866,652 | Ahmad | 1975 |
| 4,033,395 | Berg et al | 1977 |
| 4,058,152 | Beck et al | 1977 |
| 4,094,353 | Ford | 1978 |
| 4,125,660 | White et al | 1978 |
| 4,698,191 | Endo et al | 1987 |
| 4,720,509 | Nakamura et al | 1988 |
| 4,777,000 | Hideki et al | 1988 |
| Brit. 288,040 | Senitha | 1928 |

The Beckman patent proposed the use of a "liner" between the inner tube and the tier casing consisting of a leather or fabric bag filled with hollow rubber balls, while the patents to Marshall and Witzenmann proposed filling part of the inner tube with sponge rubber and inflating the rest. Barker suggested filling a tire with a rubber foam containing closed sells in a matrix of rubber-like material; with the density of the outer portions being high, while the density of the inner portions was relatively low. Senitha suggested a similar idea. Unfortunately, none of these concepts has been found to be commercially successful. Solid tires and tires filled with polyurethane foam have also been known. Thus, Lambe suggested filling a pneumatic tire partly, or entirely, with intrinsically compressed polyurethane or polyester foam produced directly within the tire at the desired pressure. Ford proposed a puncture-proof tire using a mixture of polyoxypropylene, polyether, polyol and diphenylmethane disocyanate injected into a tire casing to form a solid polyurethane tire filling material. Berq et all suggested an extruded tire with the inner space filled with a foam plastic made by injecting a plastic material, such as polyurethane, into the tire for foaming to fill the space. White et al suggested a zero pressure device composed of either microcellular or homogeneous polyurethane made by reacting an organic polyisocyanate, a polyol, a polyol ester and a polyether polyol to produce a device having an average density of 60–65 pounds per cubic foot, as a wheel assembly, and 30–42 pounds per cubic foot as a tire. Ahmad proposed a resilient tire and wheel assembly in which the cavity of a pneumatic tire is filled with a solid, resilient elastomeric polyurethane mixed with hollow glass or ceramic spheres.

However, polyurethane foam filled tires have been found to have low resiliency and poor hysteresis, which limits their usefulness. Moreover, since the polyurethane material is foamed within the tire under pressure, the manufacture of such tires is very complicated and the distribution of the foam within the tire is usually not uniform. Furthermore, polyurethane foam is susceptible to damage by oil and gasoline and the reactive materials and gas which are formed during foaming are quite toxic. Also, because low density polyurethane foam created under pressure within the tire relies on the tire casing for containment of pressure exerted by gas in the cells, such foam adds little, if any, internal support to the tire.

Beck et al proposed tubeless tires filled with polyolefin foam, in which the foam used was closed-cell 4–5 mm. foamed particles of a partially crystalline olefin polymer. The foam particles were inserted into the tire through a sealable opening in the rim of the wheel after first being "pre-shrunk" in sub-atmospheric pressure. The particles subsequently expanded against one another to fill the tire. When such a tire is punctured, the particles expand further to seal up the puncture.

Although an improvement over polyurethane foam filled tires, tires filled with small particles of polyolefin foam also have many disadvantages. First, the polyolefin foam particle filled tires rely on the tire casing for containment of the foam particles and, therefore, add no internal support to the tire, other than that of the inflated particles pressing against each other and against the tire casing. Furthermore, while a small puncture may be partly sealed by the expanding foam particles, a larger puncture may permit escape of the particles and subsequent deflation of the tire. Moreover, since the separate polyolefin particles offer no cohesive internal structure to the tire casing, they offer no protection against rupture following large punctures. In addition, although deflation is delayed, following small punctures, it eventually does occur due to diffusion of air and loss of pressure within the inflated foam particles. In addition, containment of the particles, when the tire is removed for repair or replacement, is next to impossible due to the electrostatic surface properties of polyolefin foam. Moreover, polyolefin foam particles are not biodegradable and create severe environmental hazards, since the small white particles are often mistaken for food by birds and other animals and have been shown to be extremely lethal to many species. Finally, movement of the particles against one another and against the tire casing, during use, develops internal frictional heat which cannot be avoided. This requires extremely complicated methods of conducting and dissipating heat buildup through the tire casing, which is obviously harmful to the longevity and safety of the tire casing.

These disadvantages do not apply to foam tire cores molded of fused polypropylene foam beads. Polypropylene foam beads are structural units consisting of ovoid particles of microcellular, closed cell polypropylene foam completely surrounded by a skin of polypropylene film. In contrast, the polyolefin particles of Beck et al consist of uniform pieces of polyolefin foam, preferably polyethylene, with no structural surrounding skin. Polypropylene is the lightest of the major plastics, with a specific gravity of 0.90 to 0.91. Moreover, expanded polypropylene foam can be produced with densities ranging from 0.5 pounds per cubic foot (PCF) to 18 PCF. Expanded polypropylene foam articles of 3.75 PCF have a strength to weight ratio twice that of polyurethane and 14 times greater than steel. The high strength of polypropylene, relative to other plastics, is not fully understood. However, the branched molecular arrangement appears to provide stereometric structural cohesion between molecules and there is some evidence of intrahydrogen bonding. Unlike most plastics, polypropylene seems to behave, physically, as if it were a single molecular unit, resulting in great strength and particular resistance to stretching. For this reason, thin polypropylene films have found varying applications ranging from food packaging to high altitude balloons.

It has also bee found that the expanded polypropylene foam products have outstanding shock absorbing properties. In fact, since 1985, expanded polypropylene foam has found commercial application in automobile bumper cores, reusable containers and cushion packaging. A technical field for molding polyolefin foam beads has been established, directed to steam chest molding of polypropylene foam beads, and is well known in the art. For example, Endo et al suggested a method of producing a polypropylene resin molded product from foamed polypropylene beads which comprised of introducing a pressurizing gas into foamed polypropylene foam beads having closed cells until the volume of the beads is reduced 50-99%, charging the beads in a mold cavity and introducing steam into the cavity to cause adhesion of the compressed foam beads.

Polypropylene beads may also be molded without pre-treatment to build up internal pressure within the foam beads before molding. For example, Hideki teaches a method for production of an expansion-molded article of polypropylene resin which comprised filling pre-foamed polypropylene resin beads in a mold and then heating the beads to cause the beads to expand and fuse together to form the expansion molded article conforming to the mold. In 1988, Nakamura proposed a process for preparing a foamed article which comprised charging pre-expanded polypropylene beads, having two melt temperatures, into a mold which is able to be closed, but unable to be sealed, without a procedure for giving an internal pressure to the pre-expanded beads, and heating the pre-expanded beads with steam.

Thus, it has been shown that products formed of expanded polypropylene foam are found to be strong, flexible, resistant to fatigue and chemical shock and are durable. Such qualities make this material ideally suited for forming molded tire cores. Nevertheless, none of the prior art patents have suggested this use and no method for molding such tire cores has been proposed heretofore. Thus, none of the prior art techniques have been entirely satisfactory.

BRIEF SUMMARY AND OBJECTS OF INVENTION

These disadvantages of prior art methods and materials for producing tires and tire cores have been overcome with the present invention and improved methods and materials are proposed which permit rapid and inexpensive mass production of molded polypropylene foam tire cores and produce tire cores which are extremely strong, light weight, durable, resistant to solvents and chemicals and which may be inserted in tire casings in one piece or multiple sections to provide puncture-proof and rupture-proof internal support for tires so that safer tires are produced with less need for casing reenforcement.

The advantages of the present invention are preferably attained by producing polypropylene foam tire cores formed by molding foam beads composed of polypropylene or polypropylene polymer blends and fusing them together with steam pressure.

Accordingly, it is an object of the present invention to provide improved tire cores.

Another object of the present invention is to provide an improved method for forming tire cores.

An additional object of the present invention is to provide improved tire cores formed of polypropylene foam.

A further object of the present invention is to provide improved methods and materials for producing and mounting tire cores of polypropylene foam.

Another object of the present invention is to provide improved polypropylene foam tire cores which are extremely light weight and strong, requiring less tire casing reenforcement.

A further object of the present invention is to provide improved polypropylene foam tire cores which are extremely light weight and strong and which are not susceptible to attack by water, oil, gasoline, hydrocarbon solvents or other chemicals.

An additional object of the present invention is to provide improved polypropylene foam tire cores which provide internal support for tire casings and prevent deflation upon puncture.

Another object of the present invention is to provide improved polypropylene foam tire cores which may be molded or cut in one or more separate sections and inserted in a tire casing to form a single foam tire core.

A further object of the present invention is to provide improved polypropylene foam tire cores which may be inflated through a valve in the wheel rim to permit adjustment in resilience.

A specific object of the present invention is to provide polypropylene foam tire cores composed of expanded polypropylene foam beads fused together with steam pressure and improved methods for producing such tire cores.

These and other objects and features of the present invention will be apparent from the following detailed description.

BRIEF DESCRIPTION OF THE DRAWING

FIG. 1 is a side view of a molded tire core composed of multiple sections each formed, in accordance with the present invention, of fused polypropylene foam beads, with one of the sections shown removed;

FIG. 2 is a radial cross-section, taken on the line 2—2 of FIG. 1, through a portion of the fused polypropylene foam bead tire core section of FIG. 1;

FIG. 3 is a view, similar to that of FIG. 2, showing a tire casing partly mounted on a wheel rim with the cavity of the casing filled with the fused polypropylene foam tire core of FIG. 1, showing the large size of the tire core with respect to the tire casing;

FIG. 4 is a view, similar to that of FIG. 3, showing the tire casing fully mounted on the wheel rim with the cavity of the casing filled with the fused polypropylene foam tire core of FIG. 1;

FIG. 5A is a flow diagram showing the steps of a process, embodying the present invention, for forming the molded tire core of FIG. 1;

FIG. 5B is a magnified view of the expanded polypropylene foam beads used to fill the mold in accordance with the process of FIG. 5A; and FIG. 5C is a magnified view of the polypropylene foam beads of FIG. 5B after they have been fused together by steam in accordance with the process of FIG. 5A.

DETAILED DESCRIPTION OF THE INVENTION

In that form of the present invention chosen for purposes of illustration in the drawing, FIGS. 1-4 show a tire casing, indicated generally at 10, mounted on a wheel rim 12 and having the cavity 14 of the tire casing 10 filled with a molded tire core 16 composed of a plurality of core sections 18, each formed of polypropylene foam beads fused together in accordance the process of the present invention.

In accordance with the present invention and illustrated in FIG. 5A, it has been found that excellent tire cores, such as the tire core 16 of FIG. 1, can be formed by filling a suitable mold with polypropylene foam beads and employing steam pressure to fuse the beads together into a polypropylene foam tire core, as indicated in FIG. 5A. When the polypropylene foam beads are poured into the mold, they flow, much like a quantity of dry sand, because they are an assemblage of independent spheres, as seen in FIG. 5B. However, when the steam is introduced into the mold, the pressure compresses the foam beads and the heat serves to fuse the walls of the foam beads together to form an integral framework, as seen in FIG. 5C, with a structure somewhat analogous to bone. Polypropylene foam tire cores, such as that shown at 16 in FIGS. 1-4, have this bone-like structure, as seen in FIG. 2 and, h have a superior strength to weight ratio compared to prior art. Consequently, less tire casing reenforcement is needed. This, of course, is a distinct advantage in manufacturing tires.

Furthermore, polypropylene foam tire cores are found to have excellent barrier properties and low permeability to moisture. Since there is no known solvent for polypropylene, polypropylene foam tire cores have the obvious advantage of not being susceptible to attack be oil, gasoline, hydrocarbon solvents or other chemicals.

In addition, molded polypropylene foam articles are found to have toughness and resistance to fatigue, properties ideally suited to tire cores. Due to the low specific gravity of polypropylene, polypropylene foam tire cores can be made lighter, stronger and, therefore, more economical.

Post-mold shrinkage is a normal part of the polypropylene foam molding cycle. This occurs because the steam used to fuse the polypropylene beads together passes through the molded article, displacing gases from the foam cells. Upon cooling, the water vapor condenses to liquid, decreasing the volume of the closed cells and temporarily shrinking the size of the molded foam article. These collapsed foam cell walls form an interstitial network of polypropylene fibers which retain as internal structural memory of their original shape. This internal microcellular memory creates a force that causes air to return to the deflated cells. Thus, the "deflated" article returns to normal size as air diffuses back in to fill the expanding cells. This process takes approximately 24 hours and is usually conducted at 100° F. to facilitate evaporation of water which forms on the surface of the molded articles. This post-molding expansion phase is called a "drying cycle" in the industry.

Since it is a great advantage for foam tire cores to have self-inflating properties, the current invention calls for a drying cycle conducted under a vacuum. This not only accelerates evaporation of moisture, but it prevents air from re-expanding the collapsed foam cells of the molded tire core. Such a deflated foam tire core can be stored indefinitely in its deflated condition by sealing it in airtight packaging. Subsequently, the deflated foam tire core can easily be inserted in a tire casing and mounted on a wheel rim. Thereafter, the mounted foam tire core can be made to re-expand more rapidly by inflating the tire casing, for example, through a valve in the rim. This inflated tire can be operated while the molded foam tire core is self-inflating inside. Eventually, the foam cells within the tire core expand to hydrostatic equilibrium with the hyperatmospheric inflation pressure, with the tire core expanding to exert pressure on the tire casing.

If the tire casing is punctured, the hyperatmospheric pressure in the foam cells will slowly decrease over a period of days to establish an iso-atmospheric equilibrium. However, since the tire core is made somewhat larger in diameter than the tire casing, the interstitial cell-wall network of polypropylene continues to provide internal support for the tire casing. Thus, even at iso-atmospheric equilibrium, the polypropylene foam tire core provides sufficient support for a mounted tire assembly to operate normally. This occurs because polypropylene is stiff and does not stretch in response to pressure like elastomeric foams. Further, the method suggested by Beck et al, of using polyolefin foam particle-filled tires, fails to provide lasting internal tire casing support. When a polyolefin particle-filled tire is punctured, hyper atmospheric pressure in each particle dissipates quickly because of the short distance necessary for air to diffuse to the surface of the small 4-6 mm. particles. In contrast, pressurized air within a molded polypropylene foam tire must diffuse a much greater distance from the interior of the foam core to the surface. When polyolefin foam particles, suggested by Beck et al, lose hyperatmospheric pressure within the tire, they are laterally displaced from the point of tire contact with the road and are squeezed out of the space between the tire casing and the wheel rim. A molded foam tire core cannot be so displaced and remains where it is needed to support the tire casing. Thus, a tire casing supported by a molded polypropylene foam core, being both puncture-proof and rupture-proof is consequently safer. Preferably, the foam tire core is formed with a diameter 5-75% larger than the diameter of the tire casing to exert pressure on the tire casing.

Further, these properties apply to a molded polypropylene foam tire core that is molded, or molded and cut in multiple sections, and inserted in a tire casing to form a single foam tire core. Such sections are not only much easier to install and store, but require less expensive molds. For example, as seen in FIG. 1, a tire core 14 can be molded and cut into two, three, four or more sections 16, 18, 20, 22, 24 and 26 which may be fitted together within the tire casing 10 to complete a 360° circumference.

The polypropylene foam beads which can be fused in the present invention are polypropylene beads having a diameter of 2-8 mm. and may be either crosslinked or non-crosslinked. Polypropylene resins to be used include polypropylene homopolymer, ethylene-propylene, random copolymer, ethylene-propylene-butene-1 random copolymer, polypropylene-ethylene block copolymer, silane-modified propylene. In addition, a polymer blend of the above-described polymers or a polymer blend of these polymers with less than 50% by weight of other polymers, (e.g. polyisobutyrene, ethylene-propylene rubber, polyethylene, an ethylene-vinyl acetate copolymer, etc.) may be employed. The polypropylene foam beads may contain stabilizers, such as 2,6-t-butylphenol, etc.; ultraviolet absorbents; dyes; pigments, such as titanium oxide, carbon black, etc.; lubricants, such as higher fatty acid metal salts, etc.; surface modifiers, such as higher fatty acid triglycerides, etc.; and the like.

Having now fully described the invention, it will be apparent to one of ordinary skill in the art that many changes and modifications can be made thereto without departing from the spirit or scope of the invention as set forth herein.

What is claimed is:

1. A tire core for use in a vehicle tire casing, said tire core consisting of:
   at least (one) two arcuate segments, formed prior to insertion into said casing, of molded polypropylene foam beads fused together by steam and shrunk so that, when said segments are inserted in said casing, said segments will expand and be held in compression by said casing.

2. The tire core of claim 1 wherein:
   said polypropylene foam beads are formed of polymers selected from the group consisting of:
   polypropylene homopolymer,
   ethylene-polypropylene random copolymer,
   ethylene-polypropylene-butene-1 random copolymer,
   polypropylene-ethylene block copolymer,
   silane-modified polypropylene, and
   crosslinked products of these polymers.

3. The tire core of claim 1 wherein:
   said steam was pressurized steam.

4. The tire core of claim 1 wherein:
   the fused polypropylene foam beads are composed of a polymer blend of the polymers set forth in claim 2.

* * * * *